United States Patent [19]

Shafia

[11] Patent Number: 4,862,943

[45] Date of Patent: Sep. 5, 1989

[54] ADJUSTABLE VEHICLE SUN SHADE

[76] Inventor: Fred Shafia, P.O. Box 487, Claremont, Calif. 91711

[21] Appl. No.: 202,365

[22] Filed: Jun. 6, 1988

[51] Int. Cl.⁴ ............................................. B60J 3/00
[52] U.S. Cl. ................................. 160/370.2; 296/95.1
[58] Field of Search .................... 296/97.8, 97.7, 95.1; 160/370.2, DIG. 2

[56] References Cited

U.S. PATENT DOCUMENTS

| | | | |
|---|---|---|---|
| 1,500,563 | 7/1924 | Howell | 296/97.8 |
| 2,070,208 | 2/1937 | Kelly | 296/97.8 |
| 2,596,836 | 5/1952 | Bruhl | 160/370.2 |
| 3,751,100 | 8/1973 | Keyes | 296/95.1 |
| 3,753,458 | 8/1973 | Lazarek | 160/368 |
| 4,109,957 | 8/1978 | Polizzi et al. | 296/95.01 |
| 4,353,593 | 10/1982 | Henson | 296/97.7 |
| 4,560,265 | 12/1985 | Sarver | 296/95.1 |
| 4,775,180 | 10/1988 | Phillips | 296/97.8 |

Primary Examiner—Robert R. Song
Attorney, Agent, or Firm—Sheldon & Mak

[57] ABSTRACT

An adjustable vehicle sun shade is provided. The window shade comprises a flexible shade panel and attachment means such as hook, snaps, or fibrous hook and eye fasteners for quick and easy installation and de-installation of the panel to the inside of a vehicle window. The panel further comprises at least one drawstring adapted to adjust a linear dimension of the panel by the drawing in or the letting out of such drawstring. In a preferred embodiment, a sun shade having feature of the invention comprises a flexible shade panel having drawstrings disposed along each of its borders and one or two drawstrings disposed horizontally and vertically across its center.

19 Claims, 2 Drawing Sheets

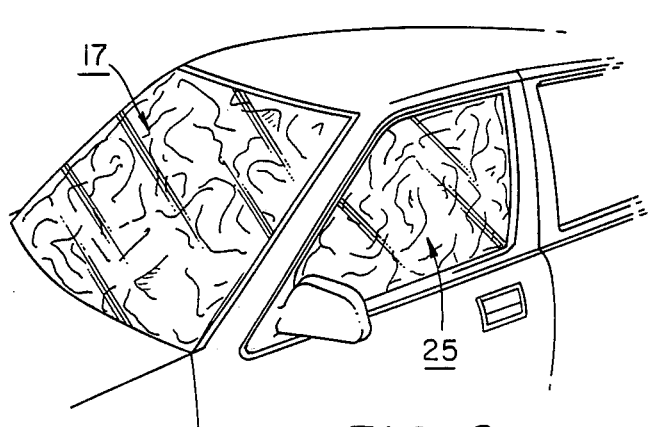
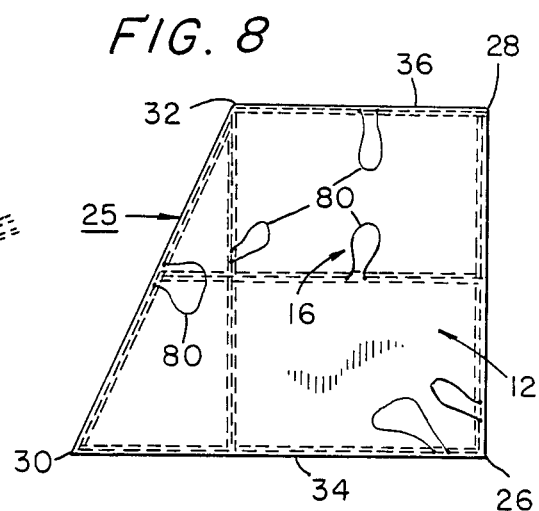
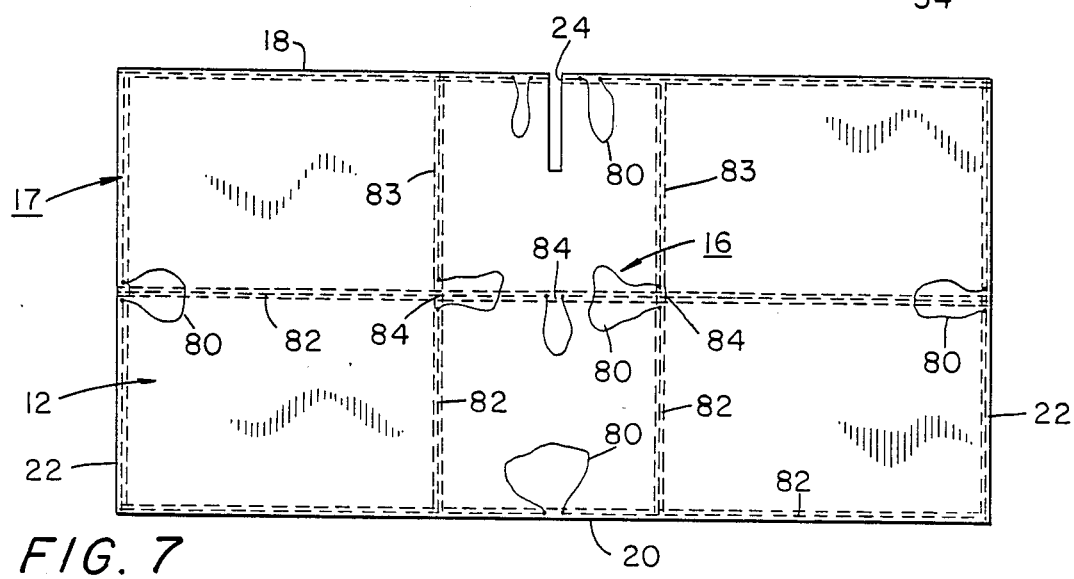
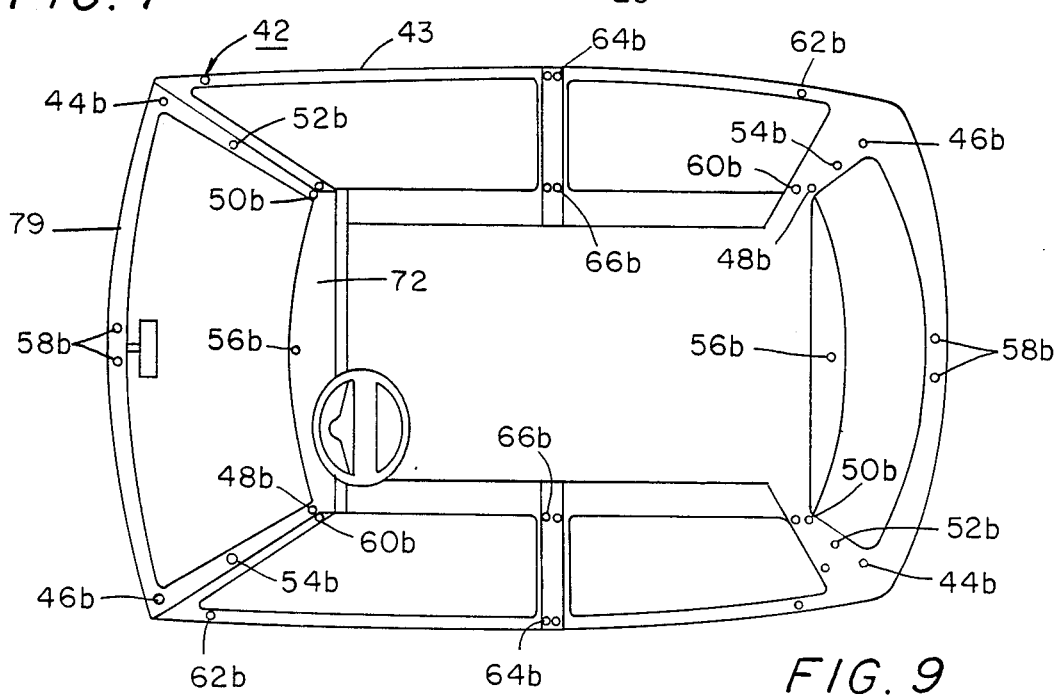

ADJUSTABLE VEHICLE SUN SHADE

BACKGROUND

Vehicle sun shades can be of great value in minimizing heat buildup within a parked automobile or other vehicle during daylight hours. Sun shades can also be of great value in protecting a vehicle's interior from radiation damage.

Flexible sun shades wherein the sun shades are prepared from a cloth-like material and which can be fastened in close proximity to the inside of the vehicle's window have the advantages over cardboard and other rigid and semi-rigid sun shades that they are easier to store when not in use and, if sized properly for all windows, they can block out nearly all of the sun's radiation.

Examples of flexible sun shades can be found in the prior art. For example, U.S. Pat. No. 4,560,245 (issued to Sarver, 1985) discloses a flexible heat transfer inhibiting curtain for vehicles comprising a reflective, flexible sun shade which can be installed in close proximity to each of the vehicle's windows by knit, loop and hook-type fasteners or similar devices.

Unfortunately, the Sarver device and all other known flexible vehicle sun shades suffer from the same fundamental problem that they are of fixed dimensions and must, therefore, be custom-fitted to each vehicle model window. This problem makes such flexible sun shades relatively expensive to manufacture and market.

There is, therefore, a need for a flexible vehicle sun shade which is adjustable in its dimensions to allow it to be used in all sizes of windows.

There is further a need for an adjustable vehicle sun shade which is simple and inexpensive to manufacture.

There is still further a need for an adjustable vehicle sun shade which is relatively simple to operate and install.

There is a still further need for an adjustable vehicle sun shade which is uniquely attractive when viewed from the exterior of the vehicle.

SUMMARY OF THE INVENTION

The present invention satisfies each of these needs.

The invention is an adjustable vehicle sun shade comprising a flexible shade panel affixed to which are attachment means for quickly and easily installing and de-installing the panel to the inside of an automobile window. The panel further comprises at least one drawstring means which is adapted to adjust a linear dimension of the panel by the drawing in or the letting out of a drawstring.

A single sun shade of the invention can be made to be adjustable to fit a windshield or rear window of almost any vehicle. Similarly, a sun shade of the invention can be made to fit any one of the side windows of almost any vehicle.

In one practical embodiment, the invention comprises a quadrangular panel having drawstrings along each of the four sides, one drawstring horizontally disposed across the center of the panel and two parallel drawstrings spaced apart and disposed vertically across the central portion of the panel.

DRAWINGS

These and other features, aspects and advantages of the present invention will become understood with reference to the following description, appended claims and accompanying drawings where:

FIG. 6 is a perspective of the exterior of an automobile illustrating a fifth and sixth sun shade embodiments encompassing features of the invention;

FIG. 7 is a backside view of a seventh sun shade embodiment encompassing features of the invention;

FIG. 8 is a backside view of an eighth sun shade embodiment encompassing features of the invention; and FIG. 9 is a cut-away view of an automobile, looking down from the top, showing example locations for attaching an adjustable sun shade having features of the invention around the windows of the automobile.

DESCRIPTION

Figure 1:
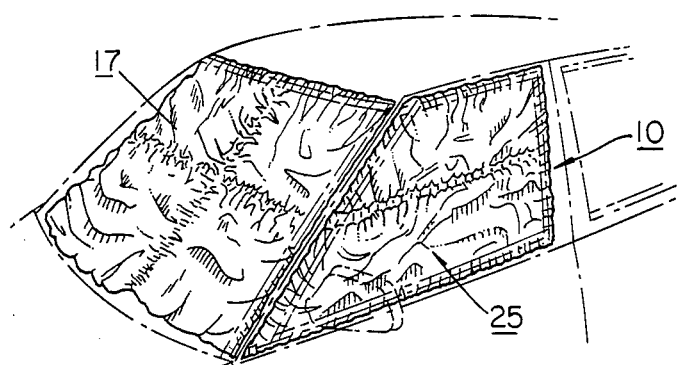
FIG. 1 is a perspective drawing showing two sun shade embodiments encompassing features of the invention, one embodiment is shown appended to the inside of an automobile windshield and a second embodiment is shown appended to the inside of the driver's side window.

The invention is an adjustable vehicle sun shade 10. The sun shade comprises a flexible shade panel 12, attachment means 14 for attaching the shade panel to the inside of the vehicle, and drawstring means 16 adapted to adjust at least one linear dimension of the panel 12 by the drawing in or the letting out of a drawstring 80.

The shade panel can be constructed of any of a variety of flexible materials. Cloth can be used. Also usable are certain flexible paper products, plastic films, and combinations of plastic and natural fiber compositions. For maximum sun protection, it is preferable that the flexible material have high heat and light reflectance properties. In a preferred embodiment of the invention, the shade panel is constructed of a metallic fabric or a fabric composed of a mixture of thread compositions including metallic threads.

The shade panel 12 material must be sufficiently flexible to be size-reducible by the use of some form of drawstring.

The shade panel 12 can be of a variety of shapes so long as the overall size of the shade panel 12 is larger than the vehicle window with which it is to be installed. By the use of appropriately disposed drawstrings 80 (described below) the panel 12 can be easily reduced to approximate the size and shape of the vehicle window.

Figure 2:
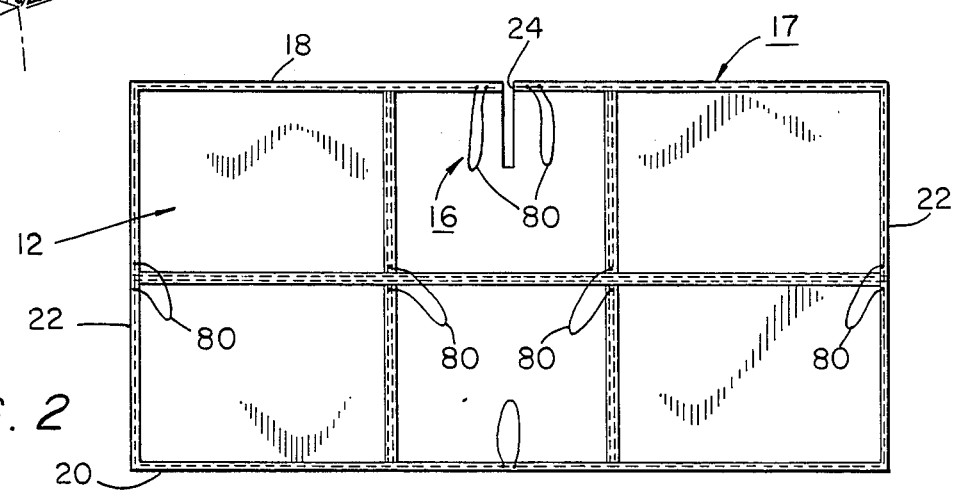
FIG. 2 is a backside view of a third sun shade embodiment encompassing features of the invention.
Figure 3:
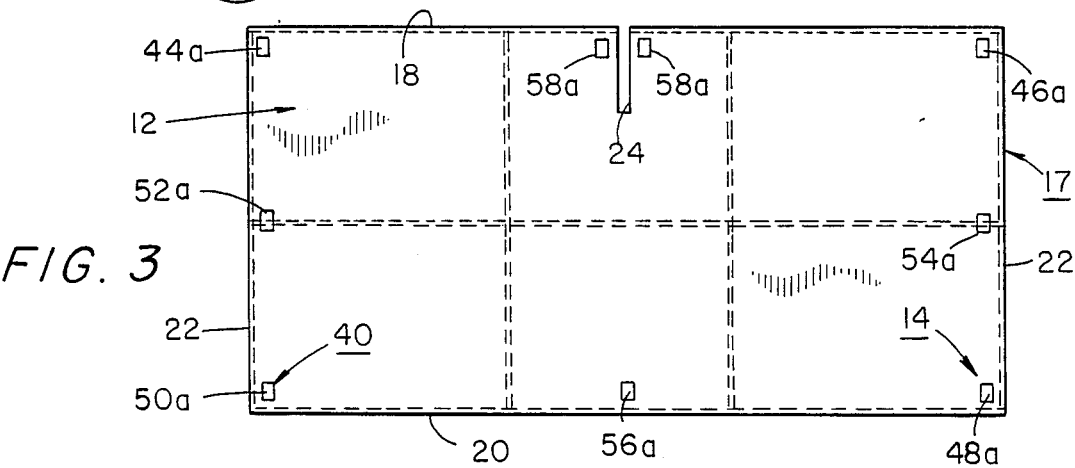
FIG. 3 is a frontside view of the sun shade embodiment shown in FIG. 2.

A preferred embodiment of a front/back shade panel 17 suitable for use with the windshield and with the rear window of a vehicle is shown in FIGS. 1, 2, 3 and 7. The front/back shade panel 17 is rectangular in shape having upper edges 18 and lower edges 20 of between about 72 and about 96 inches in length and having side edges 22 of between about 32 inches and about 48 inches in width. Front/back shade panels 17 with this shape and these dimensions have been found to fit most automobile windshields and rear windows. Most preferably the front/back shade panel 17 is rectangular-shaped with an upper edge and lower edge length between about 76 inches and about 84 inches and a side edge of between about 36 inches and about 44 inches. Front-/back shade panel 17 with this shape and these dimensions have been found to fit most automobile windshields and rear windows with a minimum of excess material for windshields and rear windows of smaller vehicles.

Preferably, front/back shade panels 17 useful with windshields have a slot 24 running from the center of the upper edge of the panel a distance of between about 4 inches and about 12 inches toward the center of the panel 17. This slit is useful in installing the front/back shade panel 17 around a centrally located rear view mirror. In a preferred embodiment, a strip of reinforcing iron-on tape or similar product (not shown) is used to cover over the slit when the slit is not in use.

Figure 4:
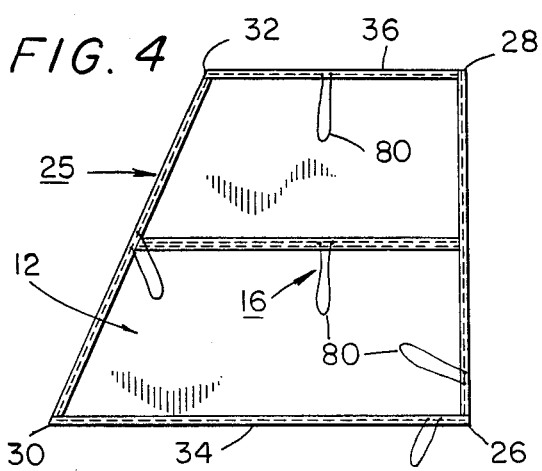
FIG. 4 is a backside view of a fourth sun shade embodiment encompassing features of the invention.
Figure 5:
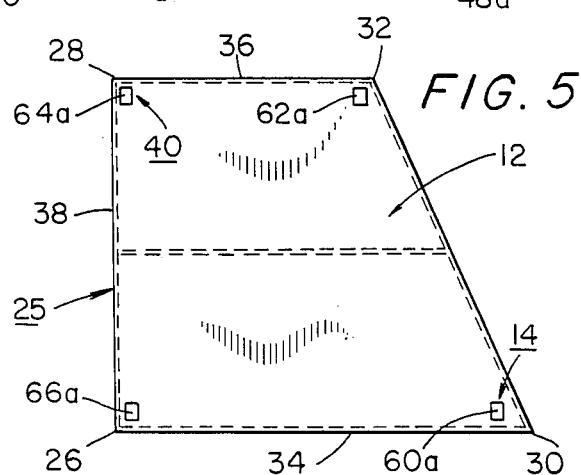
FIG. 5 is a frontside view of the sun shade embodiment shown in FIG. 4.

Embodiments of the shade panel 12 useful in combination with the side windows of vehicles are preferably smaller in size than the above-described embodiments useful for windshields and rear windows. A preferred embodiment of a side window shade panel 25 is shown in FIGS. 1, 4, 5 and 8. The side shade panel 25 is preferably trapezoidal-shaped having two corners 26 and 28 of approximately 90°, one corner 30 of between about 62° and about 67° (most preferably about 65°), and one corner 32 of between about 112° and 117° (most preferably about 115°). The side shade panel 25 has a base 34 which is preferably between about 30 and about 50 inches in length, an upper edge 36 which is between about 20 inches and about 32 inches in length and a height 38 which is between about 25 inches and about 35 inches in length. Side window shade panels 25 having this size and shape will fit most automobile side windows. Most preferably, the side window shade panel 25 has a base length between about 36 inches and about 44 inches, a top edge length between about 24 inches and 28 inches and a height between about 27 inches and about 33 inches. This size most closely approximates the size of most automobile side windows and minimizes the amount of excess material in the side windows of smaller vehicles.

The shade panel 12 is attached to the inside of the vehicle with attachment means 14 suitable for quick and easy installation and de-installation of the shade panel 12. Suitable attachment means 14 include various hooks, snaps, buttons, etc. Preferred attachment means 14 are fibrous hook and eye fasteners such as those sold under the Velcro ® trademark.

A first attachment means moiety 40 is affixed to an edge of the shade panel 12. The second, corresponding attachment means moiety 42 is affixed to the inside of the vehicle proximate to the outer edge of the window to be covered. Preferably, the second attachment means moiety 42 is affixed to the door frame or to the molding 43 which surrounds the vehicle window to be covered. Attaching the second attachment means moiety 42 to the window molding 43 as opposed to the window itself does not inhibit vision through the window and does not inhibit the opening and closing of the window.

Sufficient attachment means first moieties 40 are placed about the periphery of the shade panel 12 so that when such first moieties 40 are attached to their respective second moiety counterparts 42, the shade panel 12 securely and fully covers the window.

For a front/back shade panel 17 useful for covering windshields or rear windows, it is preferable to place a first attachment means moiety 40 proximate to each of the four corners of the panel 17 (shown as attachment first moieties 44a, 46a, 48a and 50a in FIG. 7), proximate to the midpoints of the left side edge (52a) right side edge (54a) and bottom side edge (56a), and proximate to the center of the upper edge proximate to the slit (58a).

For shade panels 25 useful for covering vehicle side windows it is preferred that a first attachment means moiety 40 be affixed to the side panel 25 proximate to each of the four corners of the panel (shown as attachment means first moieties 60a, 62a, 64a and 66a in FIG. 8).

Corresponding attachment means second moieties 42 are attached about the periphery of the vehicle window in such a way that each first moiety 40 lines up with and can be attached to a corresponding second moiety 42 (shown as attachment means moieties 44b, 46b, 48b, 50b, 52b, 54b, 56b, 58b, 60b, 62b, 64b and 66b).

The pair of attachment means second moieties 48b and 50b disposed near the upper edge of the dashboard panel 72 allow the sun shade 10 to be conveniently stored on or over the dashboard 72 when not in use. The sun shade 10 is rolled longitudinally and then attached to the second attachment means moieties 48b and 50b using any of the pairs of oppositely disposed first attachment means moieties 40 disposed on opposite vertical edges of the panel 12.

Similarly, the pair of attachment means second moieties 44b and 46b disposed near the upper molding 79 of the windshield allows the sun shade 10 to be conveniently stored above the windshield when not in use. The sun shade 10 is rolled longitudinally and then attached to the second attachment means moieties 44b and 46b disposed near the upper-most molding 79 of the windshield to any of the pairs of oppositely disposed first attachment means moieties 40 disposed on opposite vertical edges of the sun shade 10.

Also, the pair of attachment means second moieties 48b and 50b disposed near the lower edge of the rear window allows the sun shade 10 to be conveniently stored below the rear window when not in use. The sun shade 10 is rolled longitudinally and then attached to the second attachment means moieties 48b and 50b using any of the pairs of oppositely vertical edges of the panel 12.

Sun shades 10 of the invention which are used to cover the side windows of an automobile can be conveniently stored when not in use by detaching all of the attachment means 14 except one or more of the attachment means 14 disposed along one side edge of the panel 25, thereby allowing the sun shade 10 to hang downwardly to the side and/or below the window. A sash or curtain tie (not shown) can be used to hold the hanging sun shade 10 away from the window and/or other interior elements of the automobile.

The drawstring means 16 comprises a drawstring 80 disposed within the shade panel 12 along a defined linear path 82 such that the opposite ends of the drawstring are fixed to the shade panel 12 and the remainder of the drawstring 80 is slidably attached along the linear path 82. The drawstring means 16 is adapted so that tugging on the drawstring 80 tends to draw opposite sides of the shade panel 12 toward each other (i.e., reduce the linear dimension of the shade panel 12 along the drawstring linear path 82).

The central portion of the drawstring 80 can be slidably attached to the shade panel 12 by any of a number of standard drawstring attachment techniques, including but not limited to, enclosing the drawing within a "channel" of additional material 83 sewn over the drawstring 80 along the linear path 82 and having an opening 84 to expose the drawstring 80 so that drawstring 80 freely slides between its two fixed ends along the channel of attached material 83. Also, the drawstring means 16 can be disposed within the shade panel 12 by weaving the drawstring 80 in and out of the shade panel 12 along the linear path 82. Another embodiment of the drawstring means 16 employs a linear series of eyelets (not shown) adapted to allow the drawstring 80 to be strung through the eyelets along the linear path 82 across the shade panel 12. Also, special loops or staples attached to the panel and adopted to carry a drawstring 80 along the linear path 82 can be used. Also, iron-on tape can be used to create a channel through which the drawing can be strung.

The drawstring 80 can be of any suitable size and material. String, cloth, metal, twine, leather thong and ribbon can be used.

Whenever drawstring attachment method is used, the linear path 82 must provide access to the drawstring 80. Such access can be provided anywhere along the linear path 82.

Preferably, several drawstrings 80 are disposed within the shade panel 12 to allow size adjustment along several different panel dimensions. For front/rear shade panels 17, designed to be used with windshields or rear windows, it is preferred to have a drawstring 80 disposed along each of the four edges, one drawstring 80 disposed horizontally across the center of the panel 17 and two spaced-apart drawstrings 80 disposed vertically across the width of the panel 17. This preferred disposition of drawstring 80 allows the panel 17 to be adjusted in numerous ways to facilitate matching the front/rear shade panel 17 to almost any windshield or rear window size and shape.

For side shade panels 25 useful in conjunction with automobile side windows, it is preferred that drawstrings 80 can disposed along each of the four panel edges, one drawstring 80 disposed horizontally across the center of the panel 25, and two spaced-apart vertically disposed drawstrings 80 disposed across the central portion of the side shade panel 25. This preferred configuration of drawstrings 80 allows the side shade panel 25 to be easily matched with almost any size and shape of vehicle side window.

Although the present invention has been described in considerable detail with reference to certain preferred versions, many other versions should be apparent to those skilled in the art. Therefore, the spirit and scope of the appended should not necessarily be limited to the description of the preferred versions contained herein.

What is claimed is:

1. An adjustable vehicle sun shade comprising:
   (a) a flexible shade panel having a length, a width, an upper border, a lower border and two side borders; and
   (b) attachment means affixed to the borders of the shade panel for quickly and easily installing and de-installing the shade panel to the inside of a vehicle window; wherein the shade panel has drawstrings disposed along the upper border, the lower border, and the two side borders, each drawstring being adapted to adjust a linear dimension of the panel by the drawing in or the letting out of such drawstring.

2. The vehicle sun shade defined in claim 1 wherein the shade panel is comprised of a heat-reflective material.

3. The vehicle sun shade defined in claim 1 wherein the shade panel is comprised of a light-reflective material.

4. The vehicle sun shade defined in claim 1 wherein the shade panel is comprised of a cloth.

5. The vehicle sun shade defined in claim 4 wherein the cloth comprises metallic threads.

6. The vehicle sun shade defined in claim 1 wherein the shade panel is rectangular having sides between about 72 and about 96 inches in length and between about 32 inches and about 48 inches in width.

7. The vehicle sun shade defined in claim 1 wherein the shade panel is rectangular having sides between about 76 inches and about 84 inches in length and between about 36 inches and about 44 inches in width.

8. The vehicle sun shade defined in claim 1 wherein the shade panel defines a slit running from about the center of the upper edge of the shade panel a distance of between about 4 inches and about 12 inches towards the center of the panel.

9. The vehicle sun shade defined in claim 1 wherein the shade panel is trapezoidal-shaped having two corners of approximately 90°, a base which is between about 30 inches and about 50 inches in length, an upper edge which is between about 20 inches and about 32 inches in length and a height which is between about 25 inches and about 35 inches in length.

10. The vehicle sun shade defined in claim 1 wherein the shade panel is trapezoidal-shaped having two corners of approximately 90°, a base which is between about 36 inches and about 44 inches in length, an upper edge which is between about 24 inches and about 28 inches in length and a height which is between about 27 inches and 33 inches in length.

11. The vehicle sun shade defined in claim 1 wherein the attachment means comprise hooks.

12. The vehicle sun shade defined in claim 1 wherein the attachment means comprise snaps.

13. The vehicle sun shade defined in claim 1 wherein the attachment means comprise fibrous hook and eye fasteners.

14. An adjustable vehicle sun shade comprising:
   (a) a shade panel comprised of cloth having a length, a width, an upper border, a lower border, and two side borders; and
   (b) hook and eye fasteners affixed to the borders of the shade panel for quickly and easily installing and de-installing the shade panel to the inside of a vehicle window; wherein the shade panel has drawstrings disposed along the upper border, the lower border, and the two side borders, each drawstring being adapted to adjust a linear dimension of the panel by the drawing in or the letting out of such drawstring.

15. The vehicle sun shade defined in claim 14 wherein the shade panel further comprises a drawstring disposed horizontally across the center of the shade panel and a drawstring disposed vertically across the center of the panel, each such drawstring being adapted to adjust a linear dimension of the panel by the drawing in or the letting out of such drawstring.

16. The vehicle sun shade defined in claim 14 wherein the shade panel is trapezoidal-shaped having two corners of approximately 90°, a base which is between about 30 inches and about 50 inches in length, an upper edge which is between about 20 inches and about 32 inches in length and a height which is between about 25 inches and about 35 inches in length.

17. The vehicle sun shade defined in claim 14 wherein the shade panel further comprises a vertically disposed central slit running from the center of the upper edge of the panel, a distance between about 4 inches and about 12 inches towards the center of the panel.

18. A method for covering a vehicle window comprising attaching the sun shade defined in claim 1 proximate to the interior of the vehicle window and adjusting the size of such sun shade by drawing in or letting out the drawstring.

19. A method for storing a flexible vehicle sun shade comprising the steps of (i) rolling or folding the sun shade defined in claim 1; and (ii) attaching the sun shade within the vehicle using the attachment means.

* * * * *